(12) United States Patent
Grüzmann et al.

(10) Patent No.: US 11,721,456 B2
(45) Date of Patent: Aug. 8, 2023

(54) PTC HEATING ELEMENT AND AN ELECTRIC HEATING DEVICE

(71) Applicant: Eberspächer catem Hermsdorf GmbH & Co. KG, Hermsdorf (DE)

(72) Inventors: Dieter Grüzmann, Stadtroda (DE); Jan-Michael Feustel, Bodelwitz (DE)

(73) Assignee: Eberspächer catem Hermsdorf GmbH & Co. KG, Hermsdorf (DE)

( * ) Notice: Subject to any disclaimer, the term of this patent is extended or adjusted under 35 U.S.C. 154(b) by 656 days.

(21) Appl. No.: 16/808,835

(22) Filed: Mar. 4, 2020

(65) Prior Publication Data

US 2020/0286652 A1 Sep. 10, 2020

(51) Int. Cl.
| | |
|---|---|
| H05B 3/06 | (2006.01) |
| H05B 3/14 | (2006.01) |
| H05B 3/24 | (2006.01) |
| H05B 3/30 | (2006.01) |
| H01C 7/02 | (2006.01) |
| H01C 1/08 | (2006.01) |

(52) U.S. Cl.
CPC .............. *H01C 7/021* (2013.01); *H01C 1/08* (2013.01); *H05B 3/06* (2013.01); *H05B 3/141* (2013.01); *H05B 3/24* (2013.01); *H01M 2200/106* (2013.01); *H05B 2203/02* (2013.01)

(58) Field of Classification Search
None
See application file for complete search history.

(56) References Cited

U.S. PATENT DOCUMENTS

| | | | | |
|---|---|---|---|---|
| 4,034,207 A | * | 7/1977 | Tamada | ................... H05B 3/10 337/159 |
| 4,324,974 A | | 4/1982 | Steiner et al. | |
| 5,922,233 A | * | 7/1999 | Ohashi | ................... H05B 3/565 219/528 |
| 6,392,209 B1 | | 5/2002 | Oppitz | |
| 2014/0169776 A1 | * | 6/2014 | Kohl | ..................... F24H 9/1872 392/485 |

(Continued)

FOREIGN PATENT DOCUMENTS

| | | |
|---|---|---|
| DE | 2619312 | 7/1977 |
| DE | 102004045668 | 6/2005 |

(Continued)

*Primary Examiner* — Joseph M. Pelham
(74) *Attorney, Agent, or Firm* — Boyle Fredrickson S.C.

(57) ABSTRACT

A PTC heating element and an electric heating device containing such a PTC heating element are disclosed. The PTC heating element comprises two insulating layers with a metallic coating provided on one side and a PTC element arranged therebetween which is provided on oppositely disposed main side surfaces with a respective metallization which is electrically conductively connected to the coating of one of the insulating layers. The metallization provided on one of the main side surfaces is assigned only to one potential for energizing the PTC element. The metallization provided on the other main side surface is assigned to only the other potential for energizing the PTC element. The metallization of the one main side surface of the PTC element and the metallization of the other main side surface of the PTC element are formed in such a way that the current path (P) through the PTC element is extended relative to the thickness (D) of the PTC element.

12 Claims, 3 Drawing Sheets

(56) References Cited

U.S. PATENT DOCUMENTS

| | | | | |
|---|---|---|---|---|
| 2016/0360573 A1* | 12/2016 | Bohlender | ............... | H05B 3/18 |
| 2017/0370614 A1* | 12/2017 | Liu | ....................... | F24H 9/0015 |
| 2019/0335541 A1* | 10/2019 | Marlier | ................. | F24H 9/1872 |
| 2020/0286653 A1* | 9/2020 | Feustel | .................... | H05B 3/24 |
| 2021/0144811 A1* | 5/2021 | Walz | ......................... | H05B 3/44 |
| 2021/0267017 A1* | 8/2021 | Knüpfer | ................... | H05B 3/52 |

FOREIGN PATENT DOCUMENTS

| | | |
|---|---|---|
| DE | 102017209990 | 12/2018 |
| EP | 0026457 | 4/1981 |
| EP | 3334244 | 6/2018 |
| GB | 2320614 | 6/1998 |

\* cited by examiner

PTC HEATING ELEMENT AND AN ELECTRIC HEATING DEVICE

BACKGROUND OF THE INVENTION

1. Field of the Invention

The present invention relates to a PTC heating element and an electric heating device with such a PTC heating element.

The present invention relates in particular to a PTC heating element with two insulating layers with a metallic coating provided on one side and a PTC element arranged therebetween which is each provided on oppositely disposed main side surfaces with a respective metallization which is electrically conductively connected to the coating of one of the insulating layers.

2. Background of the Invention

Such a PTC heating element is known from EP 0 026 457 A2. The PTC heating element known from this prior art has a plastic frame which is injection-molded and has aluminum oxide plates attached on opposite main sides of the PTC heating element which are provided with a layer of ductile solder, which is in electrically conductive contact with PTC elements, which is provided inside the frame and provided with a metallization on the main side surfaces disposed opposite the aluminum oxide plates. In the prior art, electrical connecting tracks protrude through the frame and are soldered to the ductile solder of the aluminum oxide plate. The end-to-end metallizations provided on the two main side surfaces of the PTC element are each assigned different polarities. The power current must then penetrate the PTC element in the thickness direction in order to heat it.

Known from DE 26 19 312 is a PTC heating element with a PTC element, on each main side surface of which metallizations are arranged, each associated with different polarities. These metallizations are respectively provided on a main side surface as webs, where alternating webs associated with different polarities are provided. The invention according to DE 26 19 312 wishes, in particular, to use a current flow on the main side surface of the PTC element for local heat generation. In addition, prior art also discloses an embodiment in which the grid of various webs of different polarity provided on one main side surfaces is also provided on the opposite side, but with a lateral offset thereto, so that a partial current flows through the PTC element to generate heat in its interior.

The aforementioned prior art leaves room for improvement. The present invention intends, in particular, to provide an improved PTC heating element for use in motor vehicles. PTC heating elements of the type mentioned above are used in motor vehicles, for example, to heat liquid, to heat equipment, or the interior of the vehicle, or to have air entering the passenger compartment flow thereonto as a corrugated rib heater. Such auxiliary heaters are typically disposed downstream of a vehicle's heat exchanger and do not comprise tubes bearing coolant. Contact is established by contact elements of different polarity which are typically supported in the frame in an insulating manner. The electrically conductive tracks leading to the PTC element are also supported in a manner electrically insulated from each other in a frame that is regularly made of plastic material. These design features generally known from prior art are also preferred further developments of the electric heating device according to the invention.

SUMMARY

To solve this problem, a PTC heating element has with two insulating layers with a metallic coating provided on one side and a PTC element arranged therebetween which is each provided on oppositely disposed main side surfaces. A metallization is provided on one of the main side surfaces and assigned only to one potential for energizing the PTC element, whereas the other potential is applied to the other main side surface and the metallization provided there. To heat the PTC element by way of the power current, it is then necessary that the power current flows in the thickness direction through the PTC element. The main side surfaces are typically understood to be the largest surface of the PTC element. The PTC elements can be round. In this case, the circular surfaces, usually provided plane-parallel to each other, are the main side surfaces, but not the circumferential surfaces. However, the PTC element preferable has the shape of a cuboid. Two oppositely disposed plane-parallel main side surfaces are typically connected with an edge extending circumferentially in the circumferential direction. The edge surfaces disposed perpendicular to each other have the same thickness, i.e. height extension. This extension is commonly considerably smaller, typically by a factor of 5 or more than the smallest dimension (width or length) of the main side surfaces.

In the PTC heating element according to the invention, energizing is effected via the coating provided on the insulating layer. The Insulating layer can be a plastic film or a ceramic layer. The insulating layer can also be formed as a hybrid insulating layer formed from several insulating layers, for example, from a combination of at least one ceramic plate with at least one film. The ceramic plate there usually comprises the coating.

However, the metallizations on the two main side surfaces are provided offset to each other. Though the metallizations can partially overlap, the metallizations on the main side surfaces, however, are formed at least predominantly web or strip-shaped, where the metallizations provided on opposite main side surfaces extend the current path in the thickness direction of the PTC element through the PTC element relative to the thickness of the PTC element. Accordingly, the introduction surfaces formed by the metallization for the introduction of the power current into the PTC element on oppositely disposed main side surfaces of the PTC element are disposed in the thickness direction not exactly opposite each other. The metallizations provided on oppositely disposed sides are preferably identical, but are each formed offset and usually inverted to each other. The metallization is typically comb-shaped and comprises legs, extending in parallel in the width direction, which project from a common base extending in the length direction. For the description of the present invention, length direction means the longer of the two sides of the main side surface, whereas the width identifies the shorter of the two sides. The embodiment previously mentioned can also be provided with the base along the width direction and the legs along the length direction. On one main side surface, the base is provided at a length edge and finds no equivalent on the oppositely disposed main side surface. Instead the base on the opposite side is provided running along the edge. In a cross-sectional view through the PTC element that intersects the base, the base on the oppositely disposed main side surfaces is accordingly diagonally offset.

In other words, the metallization on the main side surfaces is typically provided in such a way that the metallization on one main side surface of the PTC element and the metallization on the other main side surface of the PTC element in a projection into a plane parallel to the two main side surfaces of the PTC element do not overlap.

With an embodiment according to the invention, current paths arise through the PTC element and thus through the ceramic body substantially diagonal to the latter. The current paths are extended relative to a conventional configuration with a metallization provided over the entire surface on oppositely disposed main side surfaces.

Contacting of the metallization on the PTC element may be effected via the coating of the insulating layer. The insulating layer metallized with the coating is preferably glued onto the PTC element. The two insulating layers are bonded to the PTC element by gluing to form a unit. Though the insulating layer typically has a full surface coating provided on the inner side thereof, the coating, however, is preferably formed corresponding to the contour of the metallization on the PTC element. The coating on the insulating layer is there formed in such a way that it covers the contour of the metallization only in part on the associated main side surface of the PTC element. Accordingly, the metallization of the PTC element has a greater planar extension than the coating of the insulating layer, at least within the region defined by the dimension of the PTC element. Because the insulating layer and the coating provided thereon can be extended beyond the PTC element laterally to create a connection to the respective pole of a voltage source. This section of the insulating layer projecting over the PTC element is not taken into account in the previously presented size ratios of the area proportions of, firstly, the metallization and, secondly, the coating.

The coating is typically is formed following the contour of the metallization. First of all, this means that those surface areas on the main side surface of the PTC element that are provided with no metallization also have no coating opposite on the insulating layer. Therefore, a gap on which neither the metallization nor the coating is provided arises between the PTC element and the insulating layer. This gap is filled with adhesive that conducts heat well. This results in good heat dissipation via the main side surfaces of the PTC element into the insulating layer which, with its outer surface, typically forms the outer side of the PTC heating element. The circumferential edges of the insulating layers can each by themselves or together be surrounded by sealing material, so that the sealing material forms a frame or a bead of adhesive around the circumferential edge of the PTC element and encapsulates the electrically conductive components of the PTC heating element therein. Only contact lugs electrically connected to the PTC element project over this edge. They typically project over the edge on the same side surface. The contact lugs are typically connected to the terminal which is formed by the coating on the insulating layer. The edge can enclose the PTC element circumferentially and thus forms a sealing strip within the meaning of the invention.

The coating may cover the metallization only in part. The coating commonly covers the previously mentioned base of the metallization, from which the legs extending parallel to each other project. The free ends of these legs typically do not contact the coating. A coating opposite to the free ends of the legs is lacking.

The electrical contact between the coating and the metallization is there normally effected by direct electrically conductive contact between the coating and the metallization. The coating and the metallization typically have certain roughness peaks which bear against each other, partially interlocking with each other. These points of contact are typically used for electrical contact between the coating and the metallization. No adhesive layer is preferably provided between the coating and the metallization. The adhesive layer is instead preferably provided only in the gap and in those areas in which the PTC element does have a metallization, but no coating is provided opposite thereto, so that the insulating layer without adhesive and due to the coating would have a clearance elsewhere which is undesirable with regard to the desired heat dissipation from the PTC element. The adhesive is accordingly used in such a way that all pin holes and voids between the PTC element and the metallization provided thereon and the insulating layer and the coating provided thereon are filled by the adhesive, but that the coating and metallization at the same time directly touch each other.

A PTC element is thus created which can exhibit a small layer thickness between the PTC element and the outer surface of the insulating layer, which promotes heat dissipation from the PTC element.

For better adhesion between the insulating layer and the PTC element, adhesive that conducts heat well and/or is electrically conductive can alternatively be provided also between the coating and the metallization. As the roughness peaks, firstly, of the coating, and, secondly, of the metallization directly contact, such an adhesive can fill remaining voids within the roughness peaks, whereby heat conduction between the PTC element and the insulating layer also improves in the region of the metallization and the coating. The adhesive can be an adhesive that conducts heat well but is not electrically conductive, as the electrical contact is caused by the roughness peaks. The adhesive can also be electrically conductive adhesive. Such adhesive preferably has electrically conductive filler material in the form of electrically conductive particles. This filler material should have a maximum grain size of more than 20 μm, preferably not more than 10 μm, particularly preferably of not more than 5 μm. For example, copper particles can be considered as electrically conductive filler material.

Heat conductive adhesive can be provided with particles that conduct heat well, for example, with ceramic particles which are usually not electrically conductive. Such adhesive that conducts heat well but is electrically non-conductive adhesive is typically provided in the previously mentioned gap between the insulating layer and the PTC element where no metallization and no coating is provided. The respective gap is preferably completely filled with the heat conductive adhesive. The same also applies to the previously mentioned clearance. The particles conducting heat well should have a thermal conductivity of at least 20 W/(m K).

The particles of the adhesive that conduct heat well preferably have a diameter that is no greater than the sum of the thicknesses of the coating and the metallization. In other words, the cumulative thickness of the coating and the metallization specifies the maximum permissible diameter of the particles adhesive that conduct heat well. If the adhesive is also provided in the clearance, then the maximum particle size is chosen correspondingly smaller.

According to one preferred further development of the present invention, a different contacting mechanism is provided between the coating and the metallization than in the gap that has no coating and/or metallization between the insulating layer and the PTC element. The contacting mechanisms are designed to be adapted to the respective requirements. Provided between the metallization and the coating can be, for example, a thin fluid adhesive film which mainly conducts heat well, but does not necessarily have to develop high bonding forces to the adhering surfaces if the gap is instead filled with adhesive that permanently secures the bond between the insulating layer and the PTC element. Such adhesive disposed in the gap will be selected in particular with regard to thermal conductivity. The adhesive (by itself or as a suspension with the particles) should exhibit good thermal conductivity of 3 to 5 W/(m K). While the connection was previously described as a connection provided by the insulating layer to which contact lugs are connected, where these contact lugs are preferably metallic contact lugs, the insulating layer according to one alternative configuration can also itself form the corresponding contact lug. In this way, the insulating layer is extended beyond the outer perimeter of the insulating material typically circumferentially encompassing the two insulating layers and the PTC element. Only the relatively short narrow segment protruding from a base surface of the insulating layer there forms a contact lug which projects over the PTC element on the edge side, where the edge is formed by insulating material, for example, in the form of a bead of adhesive, which seals the PTC element circumferentially and typically also encloses and seals the insulating layer on the edge side.

It is understood that the contact lugs are passed in a sealed manner through the sealing strip which seals the PTC element circumferentially.

The metallization and/or the coating and/or the adhesive are preferably applied by way of screen-printing methods or sputtering. Neither the insulation nor the coating is applied to the PTC element or the insulating layer over the entire surface. The insulating layer can be formed in one or several parts. It can comprise or be made of a ceramic plate.

With regard to good electrical contact and to increase the roughness peaks, the PTC element is preferably roughened in the region of the metallization.

According to another aspect, the present invention proposes an electric heating device, in particular for a motor vehicle, with several PTC heating elements of the type discussed above. The outer surface of the insulating layer facing away from the PTC element forms an exposed surface for transferring heat to the medium to be heated. This outer surface is exposed in the housing. The outer surface and also the sealing strip circumferentially sealing the PTC element and the insulating layers can be formed according to EP 3 334 244 A1 and/or be inserted into the electric heating device and electrically connected in the manner described therein. Alternatively, the outer surface of the insulating layer can also be at least in part in Heat conductive contact with a radiator against which the medium to be heated flows. Such a configuration is preferably used for an air heater. The heat emitted by the PTC element is then transferred through the insulating layer in a Heat conductive manner to individual heating ribs of the radiator element. Convective dissipation of the heat generated takes place there via the radiator element. While heat transfer in the configuration of the first case takes place directly from the outer surface of the insulating layer to the medium to be heated, heat dissipation in the configuration of the second case takes place largely between the surface of the radiator element and the medium to be heated, typically a gas, preferably air.

The electric heating device can be a heating device operated with high voltage. In this case, the current-carrying elements of the electric heating device are sealed and insulated against the medium. Sealing is there typically effected by the sealing strip and the insulating layers. The contact lugs extended therebeyond are in turn extended in a sealed manner into a connection chamber in which each individual PTC element is electrically connected to a controller and/or power supply. This connection chamber is typically part of the electric heating device and can comprise control components with which the PTC elements of the electric heating device are actuated. The connection chamber commonly accommodates at least one printed circuit board for the electrical connection of the various contact lugs. The printed circuit board can also merely group the various contact lugs of the PTC elements into one or more heating circuits made up of different PTC heating elements.

BRIEF DESCRIPTION OF THE DRAWINGS

Further details and advantages of the present invention shall become apparent from the following description in combination with the drawing, in which.

DETAILED DESCRIPTION

Figure 2:
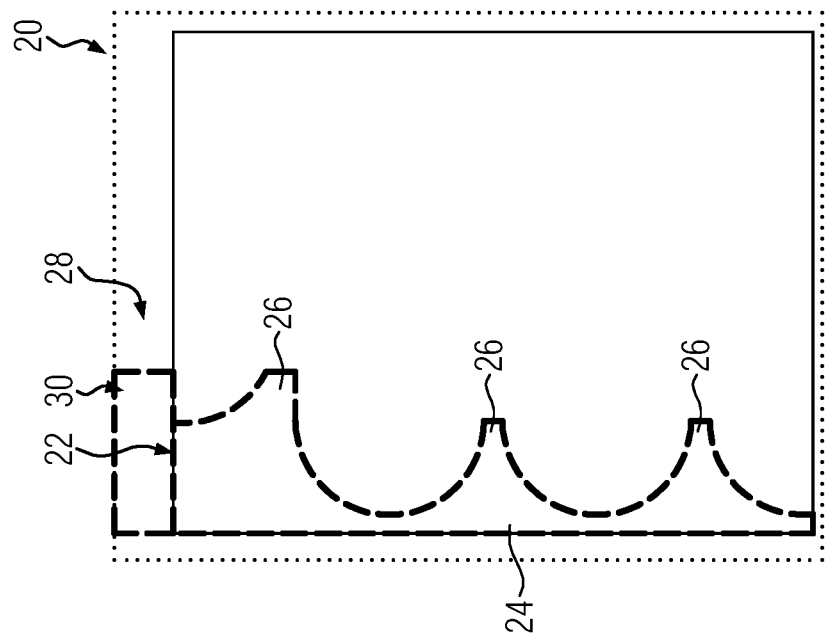
FIG. 2 shows a top view onto the insulating layer, where the metallization provided thereon is shown as a dashed line and the dimension of the associated PTC element as a chain line.

FIGS. 1 to 4 each show top views onto a PTC element 2. A metallization provided on a main side surface 4 is marked with reference numeral 6. It is formed to be comb-like and runs along a length side 8 of the PTC element 2 end-to-end as base 10. Legs 12 extending parallel to each other project from this base 10. Between the parallel legs 12, the base 10 forms a semicircular recess in which a leg 14 ends on the oppositely disposed main side surface 16 (cf. also FIG. 5). The metallization on the two main side surfaces 4, 16 is each formed such that the current path from the metallization 6 on the main side surface 4 is extended in the thickness direction by the PTC element 2 to the metallization provided on the other main side surface 16 as compared to the extension of the PTC element in the thickness direction. This thickness direction is marked in FIG. 5 with reference sign D. The current path is marked with reference sign P. In a top view onto the PTC element 2, i.e. a projection in a plane parallel to at least one of the two main side surfaces 4, 16 of the PTC element 2, there is no overlap between the metallization 6 on the one main side surface 4 and the metallization not marked with any reference sign on the oppositely disposed main side surfaces 16 (cf. FIG. 1). Instead, the metallizations on both main side surfaces 4, 16 have the same minimum distance throughout transverse to a projection in a plane parallel to the two main side surfaces 4, 16. This arises from FIG. 1 and the course of the metallization 6 shown there on the visible main side surface 4 across from the dashed metallization on the oppositely disposed main side surface 16, which is marked in FIG. 5 with reference numeral 18.

Figure 1:
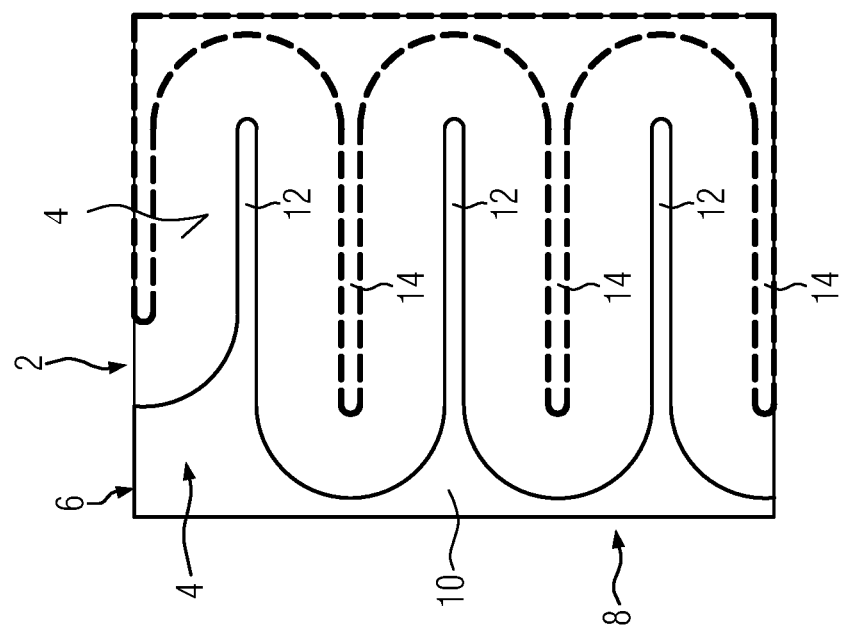
FIG. 1 shows a top view onto a PTC element with a metallization provided thereon.

FIG. 2 shows a top view onto the PTC element 2 shown in FIG. 1, the outer contour of which is illustrated as a dotted line. An insulating layer 20 projects over the PTC element 2 and is presently formed by a ceramic plate. Provided on the inner surface of the insulating layer 20 facing the PTC element 2 is an electrically conductive coating 22 illustrated in a dotted representation. This coating 22 forms a base 24, that corresponds to the base 10, from which projections 26 protrude which, like the metallization 6, are connected to the base 24 by way of a semicircular contour. However, the projections 26 are significantly shorter than the legs 12 of the metallization 6. In a longitudinal section 28 that projects over the PTC element 28, the coating 22 is extended on the inner side beyond the PTC element 2 to the form an electrical terminal 30. The terminal 30 is presently provided within the rectangular base area of the insulating layer 20. However, the insulating layer 20 can also be extended laterally beyond the rectangular circumferential surface for the formation of a contact tab, where the contact tab can project over an insulating strip, not shown, in order to form a contact lug. Alternatively, a metallic piece of sheet metal can also be attached to the terminal 30 according to FIG. 2 and, for example, surround the insulating layer 20 in the region of the terminal 30 or be soldered thereto. This sheet metal strip can also be extended beyond a sealing strip, not shown, for the formation of a contact lug.

Figure 3:
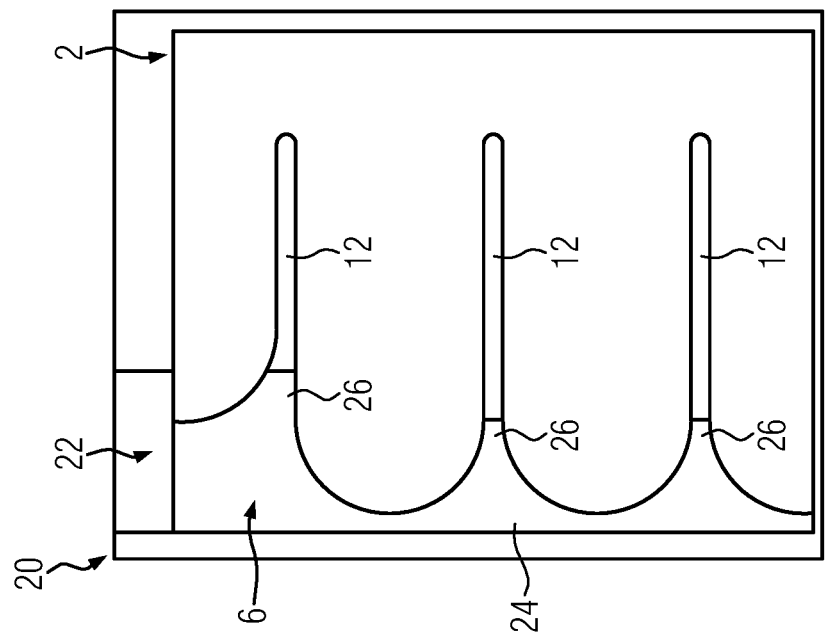
FIG. 3 shows the insulating layer illustrated in FIG. 2 after placement onto the PTC element illustrated in FIG. 1.

FIG. 3 shows the metallization 6 on the main side surface 4 together with the coating 22. Only the base of the legs 12 is evidently electrically connected via the coating 22.

Figure 4:
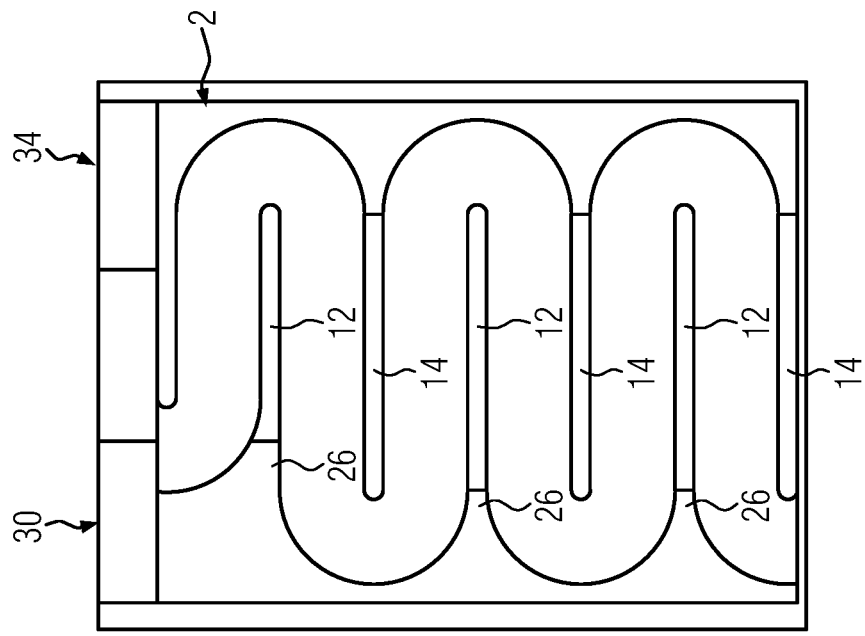
FIG. 4 shows a top view according to FIG. 3 with the metallization or coating provided on the oppositely disposed main side surface in dashed representation.
Figure 5:
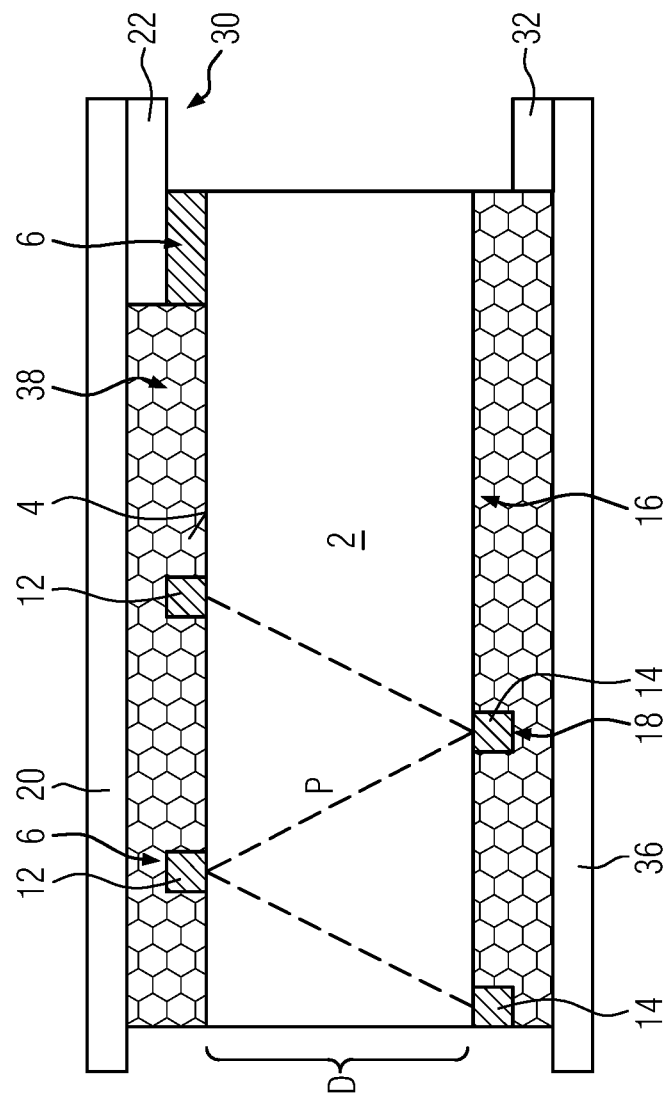
FIG. 5 shows a sectional view taken along line V-V according to the representation in FIG. 3.

FIG. 4 illustrates the electrical connection of the metallizations 6, 18 on two sides with the coatings 22, 32 on two sides (cf. also FIG. 5). The connection of the metallizations 6, 18 on the two sides correspond. The terminals 30, 34 project on the same length side from the PTC element 2. The edge of the insulating layer 20 surrounding the PTC element 2 entirely circumferentially that is recognizable in FIG. 2 is typically sealed into a sealing strip, not illustrated, as this is basically known from EP 3 334 244 A1.

FIG. 5 illustrates the contact between the insulating layer 20 of the coating 22 provided thereon, firstly, on the main side surface 4 and corresponding thereto, the contact of an oppositely disposed insulating layer marked with reference mark 36 which comprises the coating 32.

FIG. 5 further illustrates that a gap marked with reference numeral 38, which is located between the respective insulating layer 20, 36 and the associated main side surface 4, 16 of the PTC element 2, is filled with an adhesive 38. This adhesive is adhesive that conducts heat well to which particles conducting heat well, such as particles made of aluminum oxide, are added. The gap 38 is located where neither a metallization 6 or 18 nor a coating 22 or 32 is provided.

In the embodiment shown, this adhesive 38 is also at the level of the legs 12 or 14, respectively, i.e. in a clearance which is formed between the surface of the legs 12 or 14, respectively, and the oppositely disposed inner surface of the insulating layer.

The contact between the coating 22 and the metallization 6, which can be recognized in FIG. 5 only at the top right, is effected by direct metallic contact between the metallization 6 and the coating 22. No adhesive is presently provided at this contact surface. This applies to the entire region of the covering of the metallization 6 and the coating 22 on the main side surface 4 or the coating 32, respectively, and the metallization 18 of the oppositely disposed main side surface 16.

A relatively thin PTC heating element can be produced with the solution according to the invention which can also be operated with high voltage. According to the present invention, the current path is less coupled to the geometry of the ceramic base body, i.e. of the PTC element 2 as such, but only in dependence of the arrangement of the metallization on the PTC element 2. For this purpose, the metallization 6 forms legs 12 which are formed in the manner of a comb, whereby the current path P is extended relative to the thickness direction D of the PTC element 2. This also increases the number of grains within the PTC element through which the current flows. This reduces the voltage dependence of the characteristic curve shape of the PTC element 2. Because also the NTC behavior of the PTC element 2 is dependent on the voltage. The NTC behavior increases with higher specific resistance; the voltage dependence (varistor effect) increases with a small number of grain boundaries between the oppositely disposed electrodes provided on the main side surfaces of the PTC element 2. Due to the increased number of grains in the current path, the voltage drop at the individual grain or grain boundary can be less, which makes it possible to apply lower specific resistances, thereby reducing the NTC effect. By contacting the insulating layer directly against the main side surface of the PTC element, only a small number of heat resistors counteracts the decoupling of heat. This is even more true since all the voids between the insulating layer 20 and the main side surface 4 of the PTC element 2 are typically filled with the adhesive 38, which preferably has good thermal conductivity. In addition, the insulating layers 20, 36 are held on the edge side in sealing strips, preferably in a sealing frame, which can be made, for example, of silicone and can be formed by way of injection molding, enclosing the protruding edges of the insulating layers 20, 36 therein.

The PTC heating element according to the invention can then be directly exposed to the fluid to be heated, where the fluid flows around it.

We claim:

1. A PTC heating element comprising:
two insulating layers with a metallic coating provided on one side; and
a PTC element arranged therebetween, the PTC element having first and second metallizations, each being provided on one of two oppositely disposed main side surfaces, each metallization being electrically conductively connected to said metallic coating of one of said insulating layers, wherein the metallization on one of said main side surfaces is assigned only to one potential for energizing said PTC element, and the metallization provided on the other of said main side surfaces is assigned only to the other potential for energizing said PTC element, wherein said metallization of said one main side surface of said PTC element and said metallization of said other main side surface of said PTC element are aligned offset from each other along a width direction of the PTC element so that the current path (P) through said PTC element is extended relative to the thickness (D) of said PTC element.

2. PTC heating element according to claim 1, wherein said insulating layer is adhesively bonded to said PTC element.

3. PTC heating element according to claim 1, wherein said metallic coating covers the metallization with which it is associated only in part.

4. PTC heating element according to claim 1, wherein said metallic coating of said insulating layers directly conductively contacts said metallization of said PTC element.

5. PTC heating element according to claim 4, wherein said metallic coating and said metallization abut against each other without the interposition of an adhesive layer.

6. PTC heating element according to claim 1, wherein a heat conductive adhesive is provided between said insulating layer and said PTC element in a gap, which adhesive has no coating and/or metallization and fills said gap.

7. PTC heating element according to claim 1, wherein different contacting mechanisms are provided between said metallic coating and said metallization, other than in a gap that is between said insulating layer and said PTC element, and wherein the contacting mechanisms have no coating and/or metallization.

8. PTC heating element according to claim 1, wherein a sealing strip circumferentially encapsulates end faces of said PTC element.

9. PTC heating element according to claim 8, wherein two contact lugs are each formed by one of said insulating layers and project over said PTC element.

10. PTC heating element according to claim 9, wherein said contact lugs are passed through said sealing strip in a sealed manner.

11. PTC heating element according to claim 1, wherein said PTC element is roughened in the region of the metallization.

12. Electric heating device, for a motor vehicle, with a housing defining inlet and outlet openings and having several PTC heating elements, wherein each PTC heating element includes two insulating layers with a metallic coating provided on one side and a PTC element arranged therebetween, the PTC element having first and second metallizations, each of which is each provided on one of two oppositely disposed main side surfaces, each metallization being electrically conductively connected to said metallic coating of one of said insulating layers, wherein the metallization on one of said main side surfaces is assigned only to one potential for energizing said PTC element, and the metallization provided on the other of said main side surfaces is assigned only to the other potential for energizing said PTC element, wherein said metallization of said one main side surface of said PTC element and said metallization of said other main side surface of said PTC element are formed to have no overlap along a width direction of the PTC element so that the current path (P) through said PTC element is extended relative to the thickness (D) of said PTC element, wherein an outer surface facing away from said PTC element is exposed in said housing as an exposed surface for transferring heat to the medium to be heated or is at least, in part, in heat-conductive contact with a radiator element against which said medium to be heated flows.

\* \* \* \* \*